United States Patent [19]

Lewus

[11] Patent Number: 4,794,288

[45] Date of Patent: Dec. 27, 1988

[54] SERIES RESONANT CAPACITOR MOTOR

[76] Inventor: Alexander J. Lewus, 9844 N. 11th Ave., Phoenix, Ariz. 85021

[21] Appl. No.: 144,544

[22] Filed: Jan. 15, 1988

[51] Int. Cl.$^4$ .......................... H02K 11/00; H02P 1/44
[52] U.S. Cl. .............................. 310/68 R; 310/68 B; 318/794; 318/795; 318/739
[58] Field of Search ................. 310/68 R, 68 B, 68 E; 318/729, 739, 740, 793, 794, 795, 816, 817

[56] References Cited

U.S. PATENT DOCUMENTS

| | | | |
|---|---|---|---|
| 3,036,255 | 5/1962 | Lewus | 318/221 |
| 3,573,579 | 4/1971 | Lewus | 318/221 |
| 3,916,274 | 10/1975 | Lewus | 318/221 |
| 4,675,565 | 6/1987 | Lewus | 310/68 R |

Primary Examiner—Mark O. Budd
Assistant Examiner—Judson H. Jones
Attorney, Agent, or Firm—LaValle D. Ptak

[57] ABSTRACT

A series resonant capacitor motor is operated from a source of single phase alternating current power, and the start and run windings are wound on the stator electrically angularly displaced from one another by 90°. The run winding is of heavy wire, and it is connected in series with a capacitor having a high capacitance to the source of alternating current power. The start winding is connected in parallel with the series connected run winding and capacitor. During the full load and no load running conditions of operation of the motor, substantially all of the current passes through the run winding and capacitor with little or no current flowing through the start winding. The motor exhibits improved starting torque, and an additional switched starting capacitor can be connected in parallel with the series resonant capacitor to produce high starting torque.

26 Claims, 5 Drawing Sheets

SERIES RESONANT CAPACITOR MOTOR

RELATED APPLICATIONS

This application is related to my co-pending applications Ser. No. 935,009, filed on Nov. 26, 1986 and Ser. No. 088,241, filed Aug. 24, 1987; and to U.S. Pat. No. 4,675,565, issued on June 23, 1987.

BACKGROUND

Single phase alternating current electric motors are widely used for a variety of different purposes and range in size from very small fractional horsepower motors on up to multpile horsepower sizes. Single phase motors are particularly popular since most home and business alternating current supplies are in the form of single phase power supplies.

Single phase electric motors include a stator core, which is wound with start windings and run windings connected to the source of operating power. These stator windings surround and are inductively coupled to a rotor which rotates a shaft to produce the motor output. Rotors are made in a number of different configurations, such as squirrel cage rotors, high resistance rotors, low resistance rotors, wound rotors or multiple winding high and low resistance rotors. All of these configurations, along with various stator winding arrangements, are well known in the electric motor industry.

Typically, the start winding is made of relatively small diameter wire and the run winding is made of relatively large diameter wire, compared to the diameter of the start winding. These windings are physically and electrically angularly displaced from one another on the stator.

In conventional capacitor-start and capacitor-start-/capacitor-run motors, a starting capacitor is connected in series with the starting winding and a switch. At motor start-up the switch is closed and the capacitor, in conjunction with the relatively small diameter starting winding, produces a leading current in the starting winding which is approximately equal to and approximately 90° displaced in phase from the lagging current in the main or run winding of the motor. Such arrangements produce high values of starting torque.

Usually, the switch in a conventional capacitor start motor is a centrifugal or thermal switch connected in series with the capacitor and start winding across the input terminals. The run winding then is connected in parallel with this series-connected starting circuit. In such capacitor start motors, the starting condition is such that the instantaneous locked rotor current is high, and the motor starting current demand factor also is high. As a consequence, such motors undergo relatively high operating temperatures and require some type of switch for disconnecting or opening the starting winding circuit after a preestablished rotational speed of the rotor is reached. Because the starting winding of such motors generally is a relatively small diameter wire, overheating can and frequently does occur. Such overheating results in a relatively limited life of the starting winding due to burnout, particularly under overload conditions of operation of the motor.

Applicant's above mentioned co-pending applications and the above mentioned Patent all are directed to capacitor-start/capacitor-run motors which do not use small diameter starting windings, but instead, utilize two series-connected windings (of substantially the same diameter heavy wire) electrically phase displaced 90° from one another on the stator core. One of these windings has a capacitor connected in parallel with it to form a parallel resonant circuit at the operating frequency of the motor. The motors of the above applications and Patent all are high efficiency motors which overcome most of the disadvantages of the prior art capacitor-start/capacitor-run motors.

For the motor of co-pending application '935, however, the starting torque is relatively low. Thus, motors of the type disclosed in application '935 primarily are suitable for use in situations which do not require very high starting torques, such as pumps, blowers, machines tools and many commercial and domestic appliances. For utilization in situations where higher starting torques are required, the motors of co-pending application '241 and the above U.S. Pat. No. 4,674,565 are employed. These motors also use a parallel resonant circuit at the operating frequency of the motor, where the two windings of the motor are connected in series with one another, and one of the windings has a capacitor across it to form a parallel resonant circuit at the operating frequency of the motor. In addition, a second capacitor is connected in series with a switch in parallel with the first capacitor. This switch is closed during start up of the motor and is opened during normal load conditions of operation of the motor. This permits a substantial increase in the starting torque of the motor, but during normal operating or running conditions of the motor, the parallel resonant circuit functions in the same manner as disclosed in the motor of copending application '935.

Applicant also has three other patents directed to single phase motors of the capacitor start type directed to starting control circuits which produce high starting torque. These Patents are U.S. Pat. Nos. 3,036,255; 3,573,579; and 3,916,274. The '255 Patent is directed to a capacitor motor using a centrifugal or relay operated switch in the starting circuit to open the capacitor starting circuit, disconnecting it and the start winding from the motor operation during normal load conditions of operation of the motor.

U.S. Pat. Nos. '579 and '274 both are directed to solid state motor starting control circuits which do not employ mechanical switches. As a consequence, arcing, which is associated with mechanical switches, and other inherent shortcomings of mechanical switches, such as centrifugal switches, are overcome by the solid state circuitry used in the starting control circuit of these two patents. These patents, like other prior capacitor start motors, however, have starting capacitors connected in series with a start winding and the switch; so that starting current is applied through the start winding only during the start up portion of operation and the motor. Once the motor reaches or nears operating running speed, the solid state switch creates an open circuit condition in the starting circuit; and the starting winding is removed from further operation. Consequently, such a solid state motor starting control circuit functions in a manner similar to the mechanical switch circuits of the prior art to control the connection and disconnection of the starting winding from the power input terminals, in accordance with the particular state of operation of the motor.

It is desirable to provide an efficient motor which is capable of producing a high starting torque while still retaining the advantages of the above-identified copending applications.

SUMMARY OF THE INVENTION

Accordingly, it is an object of this invention to provide an improved alternating current motor.

It is another object of this invention to provide an improved alternating current motor operated from a single phase alternating current power supply.

It is an additional object of this invention to provide an improved single phase alternating current motor which operates at high efficiency and which develops high starting torque.

It is a further object of this invention to provide a high efficiency alternating current motor operating with a series resonant circuit.

It is still another object of this invention to provide an alternating current motor employing a run winding of relatively large wire size connected in series with a capacitor having a large capacitance to provide series resonant operating conditions with improved efficiency.

In accordance with a preferred embodiment of the invention an alternating current motor is operated from a source of single phase alternating current power. The motor has first and second windings electrically angularly displaced from one another by substantially 90° on a stator core and inductively coupled to a rotor. The first winding is connected in series with a capacitor to a source of alternating current power. The second winding is connected in parallel with the series circuit of the first winding and the capacitor. The capacitor and the first winding form a series resonant circuit at the frequency of the alternating current power supply, and the wire size of the first winding is relatively large to permit it to carry the full load operating current. The capacitor has a large capacitance; and the circuit operates such that, during normal load operating conditions, little or no current flows through the second winding. The motor produces a relatively high starting torque; and if increased starting torque is desired, a switched capacitor is connected in parallel with the series-connected capacitor during the start up conditions of operation of the motor.

DETAILED DESCRIPTION

Reference now should be made to the drawings where the same reference numbers are used in the different figures to designate the same or similar components.

Figure 1:
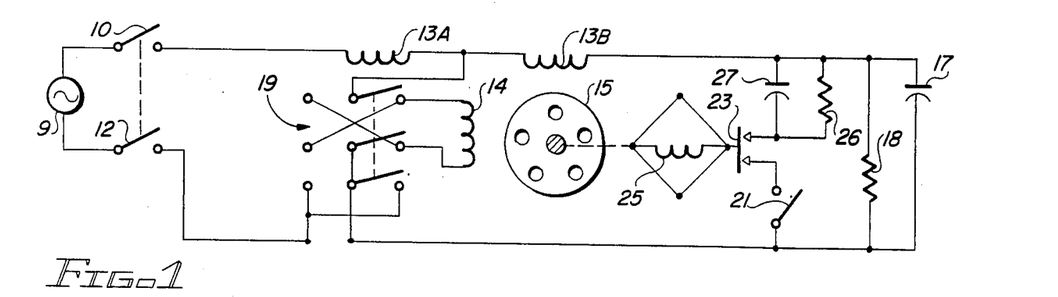
FIGS. 1 thorugh 6 are schematic diagrams of preferred embodiments of motors according to the invention.

FIG. 1 is a schematic diagram of a single phase capacitor run motor capable of developing either moderate or high starting torque. Conventional split capacitor motors or capacitor run motors develop very low starting torques, so they typically are used for applications such as fans and blowers which do not require high starting torques. The circuit of FIG. 1 essentially comprises two motors in one, namely a motor which, in one mode of operation, is capable of producing high motor starting torque of the type associated with known capacitor start motors. In another mode the mode operates as a switchless motor which develops a moderate starting torque developing rapidly to a high torque following initial start, so that the motor is capable of use in a wide variety of applications.

In the circuit of FIG. 1, single phase alternating current power is supplied from a suitable source 9 through a double-pole single-throw switch 10/12. A center tapped run winding 13A, 13B is wound on the stator core and is connected in series with a run capacitor 17 across the switch. A start winding 14 also is wound on the stator and is connected to the center tap between the winding sections 13A and 13B.

To permit instantaneous reversal of operation of the motor, a three-pole double-throw reversing switch 19 is employed to reverse the direction of the current flow through the winding 14 with respect to the current flow through the winding sections 13A and 13B. If this reversing feature is not desired, however, the switch 19 may be eliminated, with the winding 14 being connected directly between the junction of the winding sections 13A and 13B and the terminal of the switch 12. From an examination of FIG. 1, it can be seen that when the poles of the switch 19 are in the right hand position, the upper end of the winding 14 is connected to the junction between the winding sections 13A and 13B and the lower end to the switch 12. When the poles of the switch 19 are in the left hand position, this interconnection is reversed; so that the lower end of the winding 14 is connected to the junction between the winding sections 13A and 13B and the upper end is connected to the switch 12. During the running of the motor of FIG. 1, the switch 19 can be switched from one position to the other, causing instantaneous reversal of the rotation of a rotor 15 which is surrounded by the stator on which the windings 13 and 14 are placed.

The capacitor 17, which is connected in series with the winding section 13B, has a large value of capacitance in contrast with the typical starting capacitor used in capacitor start or split capacitor motors. In addition, the wire size of the winding sections 13A and 13B is relatively large. Typically, for a one horsepower motor, the wire size of the winding sections 13A and 13B is number 16 or number 17 wire while the wire size of the winding 14 is number 18 or number 20 wire. The capacitance of the capacitor 17, operating at 370 volts, is approximately 80 microfarads. These values are not to be considered limiting, but are representative of values which have been found to provide the desired operating characteristics of the motor shown in FIG. 1.

During the operation of the motor from start through no load and/or full load conditions, the capacitor 17 in series with the winding section 13B forms a series resonant circuit, the resonance of which is selected to be at or near the 60 Hz frequency of the power supply 9. Obviously if power supplies of different frequencies, such as 50 Hz or 120 Hz are used, the resonance of the series resonant circuit consisting of the winding section 13B and the capacitor 17, is selected to match the frequency of the particular alternating frequency source 9. The capacitor 17 is an alternating current non-polarized capacitor and may be an electrolytic capacitor, a metallized foil capacitor, or a metallized polypropylene capacitor.

The motor of FIG. 1 causes a substantial portion of the total current at start up to flow through the winding 14. This current, however, rapidly drops to near zero, with essentially all of the operating current flowing through the run winding sections 13A and 13B. This shift of the current flow occurs automatically as a result of the characteristics of the series resonant circuit, so that the start winding 14 may be made of relatively small diameter wire. There is no danger of burnout of the starting winding since it never carries any high current for any prolonged period of time. In fact, during normal run operation of the motor, the start winding 14 could be switched entirely out of the circuit, if desired. This is not necessary, however, since the current automatically drops to zero or near zero due to the inherent operating characteristics of the motor.

The circuit described thus far produces a moderate starting torque which develops to substantially full or maximum torque at approximately 50of the rated RPM value of the motor. When the motor reaches full operating speed at full load, the torque drops down to a point which is near the starting torque.

If, however, a high starting torque is desired, a starting capacitor 27 may be connected in parallel with the capacitor 17 through a pair of switches 21 and 23. The switch 21 is used to optionally connect the starting capacitor 27 into or out of the circuit on a semi-permanent basis. This permits use of the motor as "two motors in one". When the switch 21 is open, obviously the capacitor 27 is never connected into the circuit and has no effect on the circuit operation. The motor then exhibits moderate starting torque, as described. When the switch 21 is closed, however, the capacitor 27 is connected in parallel with the capacitor 17 during motor start up. The second capacitor 27, in parallel with the capacitor 17, causes the phase displacement of the currents through the windings 13 and 14 to be in the vicinity of a 90° displacement during motor starting conditions. This produces a high starting torque in the motor which is considerably greater than when the capacitor 27 is not used in the circuit. Once the rotor 15 of the motor attains or approaches its normal operating speed, a centrifugal switch 25 coupled to the rotor 15 opens the contacts 23 and removes the capacitor 27 from the circuit.

An energy dissipating resistor 26 is connected across the capacitor 27 for the purpose of dissipating any energy stored in the capacitor 27 at the time the switch 23 opens. A similar energy dissipating resistor 18 is connected across the series resonant capacitor 17 for the same purpose whenever the switch contacts 10 and 12 are opened to turn off the motor or disconnect it from the source of alternating current power 9.

A significant feature of the motor which is shown in FIG. 1 is its capability of instantaneous or nearly instantaneous reversal, under either light load or heavy load, without the necessity of first stopping the rotation of the rotor 15. This is accomplished, as mentioned previously, by changing the position of the reversing switch 19 from the right hand position to the left hand position or vice-versa. This reverse the very light current flow through the winding 14 a sufficient amount to reverse the phase of operation of the entire circuit to rapidly and instantly reverse the direction of rotation of the rotor 15. This can be accomplished at full operating RPMs, if desired.

Figure 2:
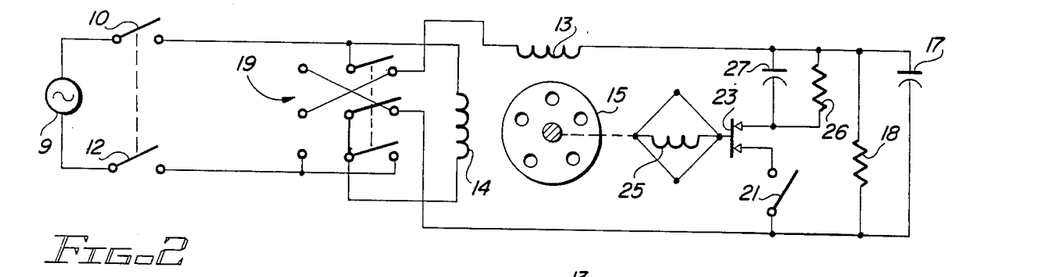

FIG. 2 is another embodiment of the invention employing a single run winding 13 (not center-tapped as in FIG. 1) and which has the reversing switch 19 connected to the run winding 13 instead of to the start winding 14. In all other respects, the system of FIG. 2 operates the same as the circuit of FIG. 1. The winding 13 is made of heavy wire (number 16 or number 17 wire has been found to be suitable) and is connected in series with the capacitor 17 to form a series resonant circuit at the operating frequency of the motor. When the reversing switch 19 has the poles moved to the right, the left-hand end of the winding 13 is connected to the switch 10, and the lower terminal of the capacitor 17 is connected in common with the lower end of the winding 14 to the bottom or return side of the power supply 9 by way of the switch 12. When the poles of the reversing switch 19 are moved to the left, as viewed in FIG. 2, the left hand end of the winding 13 is connected through the poles of the switch 19 to the lower end of the winding 14 and the switch 12. The lower terminal of the capacitor 17 then is connected through the switch 19 (the upper pole thereof) to the switch 10, thereby reversing the connections of the series resonant circuit 13, 17 with respect to the winding 14. This provides the capability of instant reversal of the operation of the rotor 15 of the motor whenever the poles of the switch 19 are moved from their far right position to the far left position and vice-versa.

Thus, it can be seen that the reversing switch 19 may be connected with either one of the windings 13 or 14 to effect the reversal of direction of rotation of the rotor 15. In all other respects the circuit of FIG. 2 operates in the same manner as the circuit of FIG. 1 which has been described above.

Figure 3:
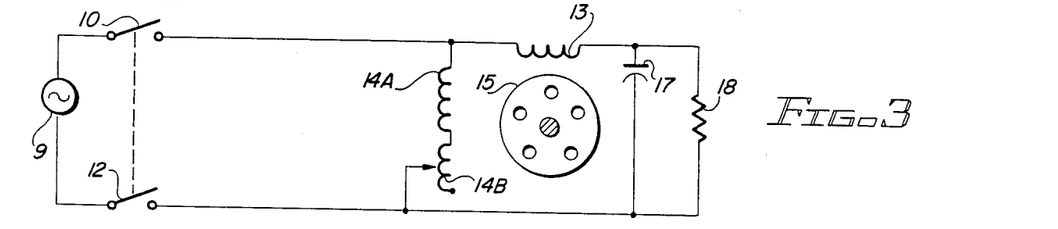
Figure 4:
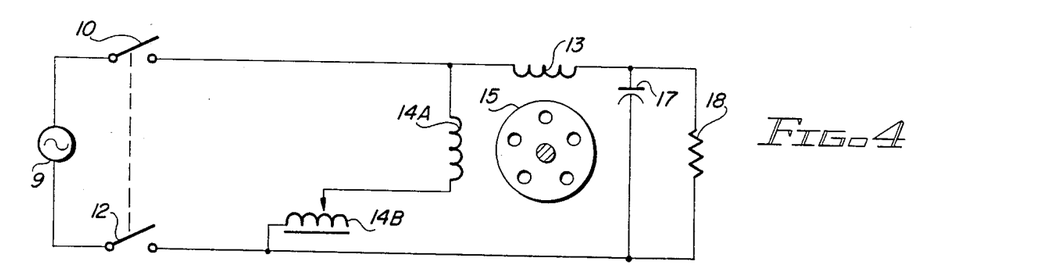
Figure 5:
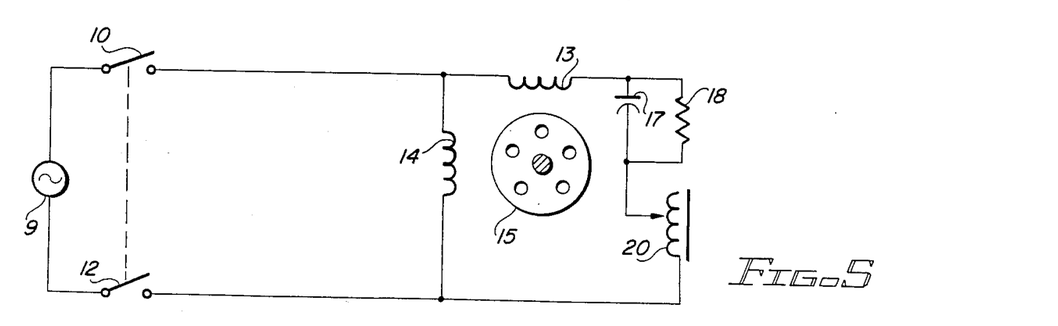

FIGS. 3, 4 and 5 illustrate motor with moderate starting torque, which have a further provision for varying the speed of operation of the rotation of the rotor 15. The winding arrangements of the circuits of FIGS. 3, 4 and 5 for the run winding 13 and start winding 14 essentially are the same as the arrangement shown in FIG. 2. In each of these circuits, the capacitor 17 is in series with the run winding 13 (having large diameter wire) to form a series resonant circuit at the operating frequency of the alternating current power supply from the source 9. In the circuit of FIG. 3, the start winding comprises a two section winding, 14A and 14B. The winding 14A is comparable to the winding 14 of FIGS. 1 and 2. This winding, however, is connected in series with a winding 14B which has a slide tap on it to vary the number of turns of the winding 14B which are connected in series with the winding 14A. This tap, in turn, is connected to the switch 12; so that by varying the position of the tap on the winding 14B, different number of turns (and therefore a different inductance) is provided for the composite start winding. This varies the speed of operation of the rotor 15 of the motor under load conditions.

FIGS. 4 and 5 are additional speed control configurations. The circuit of FIG. 4 is similar to the one of FIG. 3, except that the tap on the winding 14B is connected between the junction of the winding 14A and the winding 14B instead of with the switch 12 as in the circuit of FIG. 3. This circuit of FIG. 4, however, operates to control the speed of rotation of the rotor 15 in the same manner as the circuit of FIG. 3. FIG. 4, however, illustrates an alternative wiring interconnection between the winding sections 14A and 14B.

The circuit of FIG. 5 employs a reactor (auto transformer) in series with the series-connected run winding 13 and capacitor 17. Instead of returning the lower terminal of the capacitor 17 directly to the switch 12, the reactor 20 is connected between switch 12 and the capacitor 17. The variation of the reactance of the reactor 20, as established by the setting of the slide point, functions to change the voltage across the capacitor 17, which in turn operates to change the power of the motor.

Figure 6:
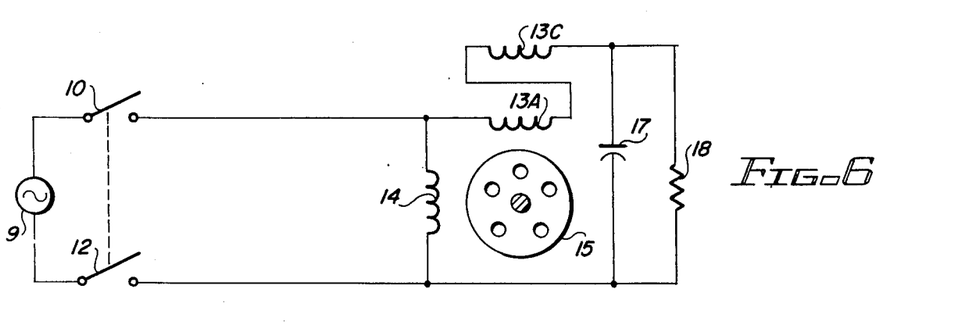

The circuit of FIG. 6 is similar to the circuit of FIG. 2, except the run winding 13 has been broken into two sections 13A and 13C which are inductively coupled together in a transformer like relationship to increase the voltage across the capacitor 17. This has the effect of increasing the starting and running torque of the motor.

It should be understood that a reversing switch 19 arranged either as shown in FIG. 1 or FIG. 2, also can be used with the embodiments shown in FIGS. 3 through 6. In addition, the starting capacitor circuit consisitng of the second or starting capacitor 27, centrifugal switch 25, 23 and the switch 21, also may be connected in parallel with the series-resonant capacitor 17 in the circuits of FIGS. 3 through 6, if desired. These features have not been repeated in FIGS. 3 through 6 since the function of both the reversing switch 19 and the second or additional starting capacitor circuit, including the capacitor 27, is the same for all of the circuits and operates in the same manner in the circuits of FIGS. 3 through 6 as in the embodimetns shown in the circuits of FIGS. 1 and 2.

In the operation of all of the embodiments of FIGS. 1 through 6, a significant difference exists between these circuits and conventional capacitor run circuits. In conventional circuits, the capacitor is connected in series with a relatively small wire size start winding. In the circuits of FIGS. 1 through 6, this circuit interconnection is reversed. The run winding is made of relatively heavy wire and is connected in series with a large capacitance capacitor so that the major current flow (essentially all of the current flow) which takes place during the operation of the motor flows through the capacitor 17 and the run winding 13, with current through the start winding 14 automatically inherently dropping to near zero upon attainment of the full load and no load operating conditions of the motor.

In all of the embodiments of FIGS. 1 through 6, the starting winding 14 briefly carries practically all of the current at initial startup. Because the two windings are electrically dephased by 90° on the stator, high starting torque is developed, but the current flow through the winding 14 rapidly drops off as the rotation of the rotor 15 increases. The final running current through the winding 13 is controlled by the size of the capacitor 13. The series resonance of the circuit consisting of the winding 13 and the capacitor 17 builds a maximum current through the run winding 13 to an amount which is limited by the capacitance of the capacitor and the voltage applied across the capacitor 17. This series resonance takes place immediately upon motor starting and throughout full load and no load running conditions of operations.

Upon motor start conditions, the start winding 14 carries the full wattage load of the given motor horsepower, while the run winding with its capacitor 17 in series is dephased from the start winding 14 by substantially 90° electrically. At full load or near full load operation, a change takes place where the run winding, with the capacitor 17 in series, has the full wattage of the horsepower of the motor across it; and the start winding 14 leads or lags isolated current dephased from the run winding 13 in the vicinity of 90 electrical degrees. Since the run winding 13 of all of the different embodiments of FIGS. 1 through 6 carries substantaiily all of the power developed by the motor as a result of the operation of the series resonant circuit, consisting of the winding 13 and the capacitor 17, there is no danger of burnout of the start winding 14, even if the start winding is wound of relatively small size wire (such as number 18 or number 20 wire).

Figure 7:
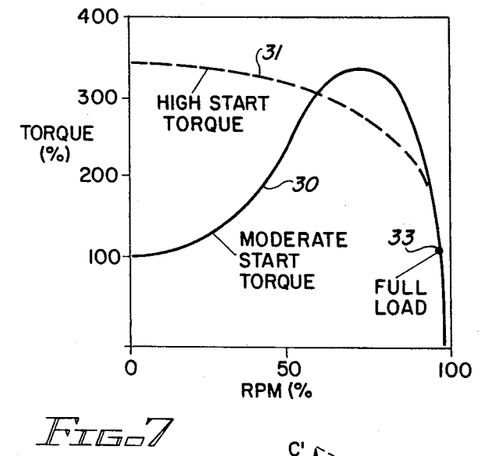
FIG. 7 is a curve illustrating the relative starting and running torques of the motor of FIG. 1.

FIG. 7 illustrates the differences in starting torque versus motor RPMs which are provided by (a) the switchless versions of the circuit (such as shown in FIGS. 3 through 6 and which occur when the switch 21 of FIGS. 1 and 2 is open) and (b) the operation of the system when the switch 21 is closed to employ the separate starting capacitor 27, described above in conjunction with FIGS. 1 and 2. In the circuits of FIGS. 3 through 6 and the circuits of FIGS. 1 and 2 with the switch 21 open, the plot of torque versus RPMs is illustrated by the curve 30. It can be seen that the starting torque of curve 30 is a relatively moderate torque which builds to a maximum amount approximately at a speed of rotation which is 50% of the final or full load rotational speed of the motor. This fulll load speed is shown at the point 33 on FIG. 7. This is a switchless version of the motors such as shown in FIGS. 3 through 6.

If a starting capacitor 27 of the type shown in FIGS. 1 and 2 is employed, the motor exhibits a very high starting torque as shown on the curve 31 of FIG. 7. This starting torque is in excess of 300% and exceeds the full load torque at the point 33, as is readily apparent from an examination of FIG. 7.

Figure 8A:
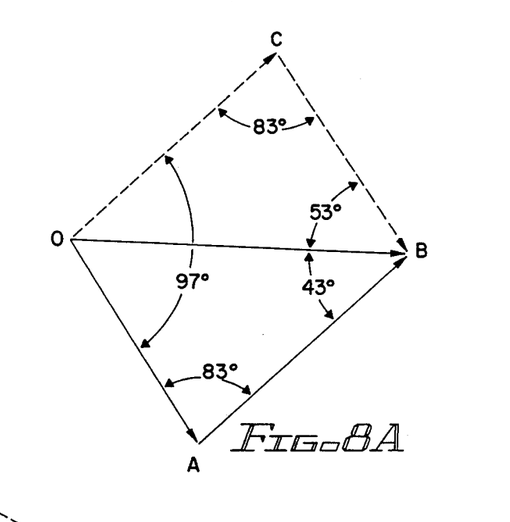
FIGS. 8A through 8D are vector diagrams of operating conditions of the motor shown in FIG. 1.

FIGS. 8A through 8D illustrate, respectively, the vector diagrams for the motor of FIG. 1 at start (with switch 21 closed), at start (with switch 21 open), full load and no load conditions of operation. In FIG. 8A, the current vectors for the motor at start up are dephased by substantially 97° to produce a high starting torque. This dephasing is a result of the combined capacitance of the capacitors 17 and 27. The relative capacitance of the capacitors 17 and 27 is such that the capacitance of the start capacitor 27 is higher than that of the capacitor 17 (for example 175 microfarads for capacitor 27 and 50 to 80 microfarads for the capacitor 17). The composite effect of this capacitance upon the starting current is illustrated in FIG. 8A. The vector OA constitutes the current through the start winding 14, and the vector AB constitutues the current through the run winding 13. Line current is shown by vector OB.

Figure 8B:
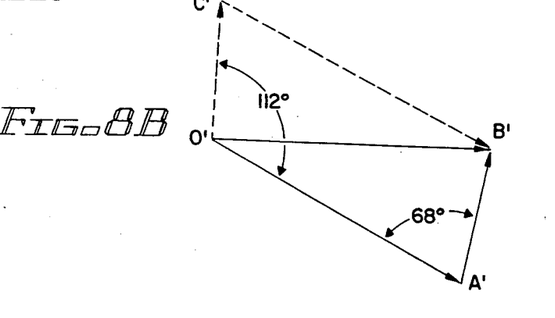

FIG. 8B illustrates the start conditions for the motor of FIG. 1 with the switch 21 open. This means that the capacitor 27 is not in the circuit and only the series resonant capacitor 17 is in the circuit. It can be seen that the phase displacement between the two windings in this mode of operation is approximately 112° and that a greater proportion of the current flows through the winding 14 (as shown by the vector OA') than flows through the winding 13B (as shown by the vector A'B').

Figure 8C:
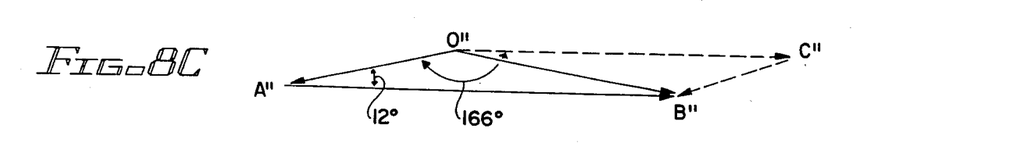
Figure 8D:
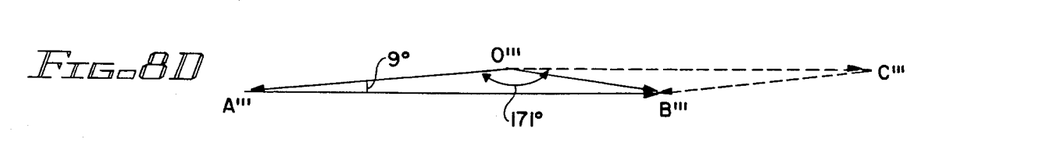

FIGS. 8C and 8D illustrate, respectively, the current vectors for the motor of FIG. 1 at full load and no load operating conditions. It is readily apparent from an examination of these figures that the current vectors of the windings 14 and 13B are approximately 180° out of phase; and consequently, the capacitor current controls the motor operation. It also is apparent from an examination of FIGS. 8C and 8D that the current through the starting winding 14 falls in the second or negative cosine quadrant, which cause in the current through the winding 14 to be a lagging current. This causes the motor operation to be at a near unity power factor.

FIGS. 9A through 9D are vector diagrams of the operating characteristics of the motor of FIG. 1 which have the voltage vector diagrams superimposed over the current diagrams of FIGS. 8A through 8D. The current vectors are the same as those shown in FIGS. 8A through 8D, and the voltage vectors constitute the vectors AV/BV (for winding 13A) and BV/CV (for the run winding section 13B). The vector O/BV constitutes the voltage across the start winding 14, adn the vector O/CV constitutes the line voltage.

Figures 9A, 9B, 9C, 10:
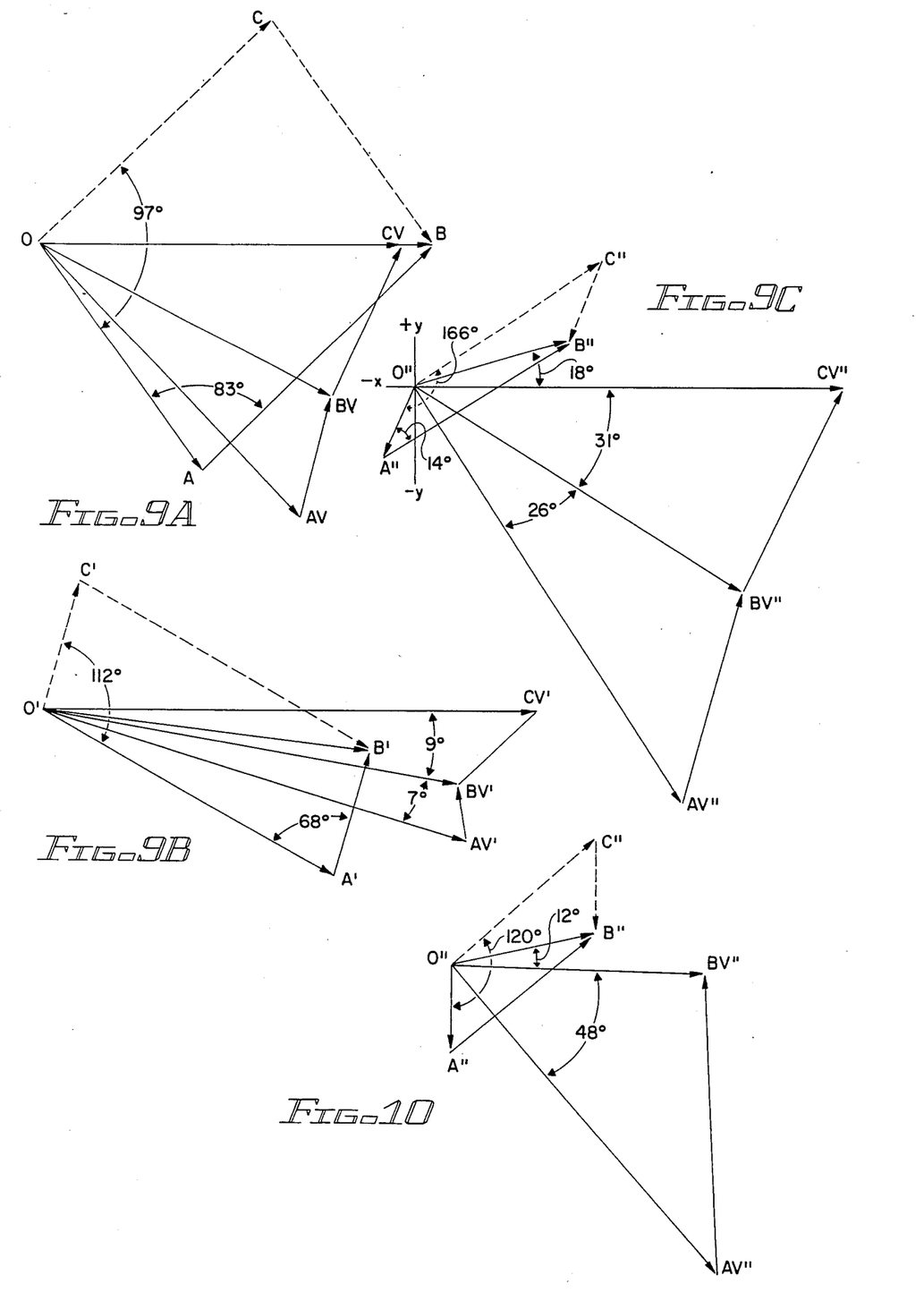
FIGS. 9A through 9D are vector diagrams of additional operating conditions of the motor shown in FIG. 1.
FIGS. 10 through 13 are vector diagrams of the the operating conditions of the motor shown in FIG. 2.

FIG. 9B illustrates the moderate torque starting conditions of operation which exist when the switch 21 of FIG. 1 is opened. The various vectors are shown with a prime (') but otherwise the designations are the same as those given in conjunction with FIG. 9A. The various voltages, however, and the relationships of the voltages and currents to one anther are considerably different from the starting conditions with the switch 21 closed, as illustrated in FIG. 9A.

FIG. 9C shows the full load current and voltage vectors for the motor of FIG. 1. The full load operating conditions are the same, whether the starting capacitor 27 is or is not used since at full load, the capacitor 27 always is switched out of the circuit in the manner described previously in conjunction with the description of the operation of the circuit of FIG. 1. The vectors shown in FIG. 9C are the same as those described previously in conjunction with FIGS. 9A and 9B except that each of the vectors is provided with a double prime (") in this figure.

Figures 9D, 11:
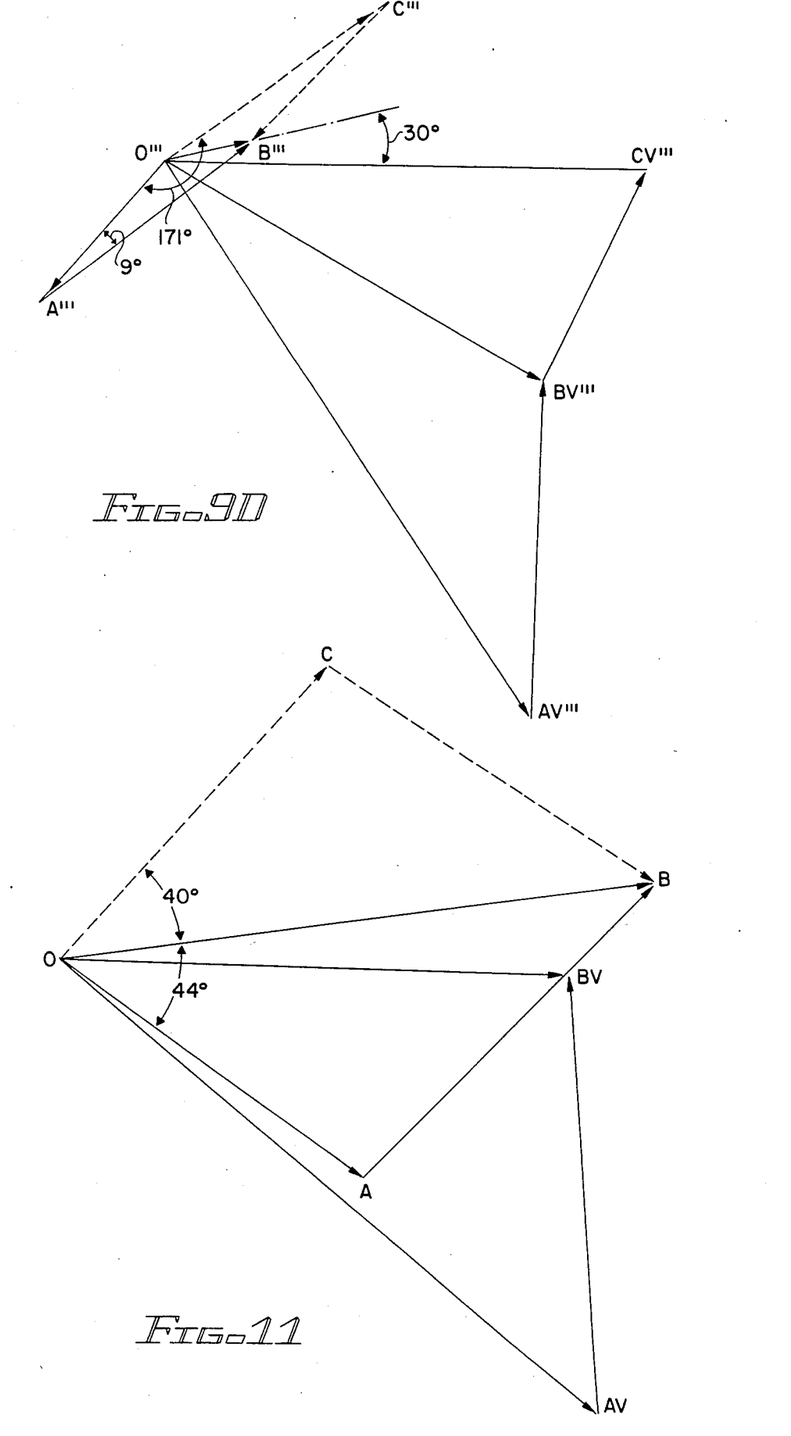

Finally, FIG. 9D shows the operating current and voltage vectors for the motor of FIG. 1 under no load conditions of operation. In the operation of the motor which is represented by the vectors of FIGS. 9C and 9D, the operating speed essentially is the full operating RPM of the motor as illustrated by the point 33 on the curves of FIG. 7.

An actual motor modified to have the winding configuration illustrated in FIG. 1 and from which the information providing the basis for the vector diagrams of FIGS. 8A through 8D and 9A through 9D has been constructed. The motor used was a standard Dayton motor, frame 56, model Number 5K4310. This was a one horsepower motor, 1725 RPM, 230 volts, 7.4 amps. The stator was rewound in accordance with the configuration of FIG. 1, with number 16 wire for the winding sections 13A and 13B and with number 18 wire for the start winding 14. In addition, the winding which was used as the run winding in the original motor is employed as the start winding 14 and the rewound start winding is used as the run winding 13A, 13B. The table below indicates measurements taken at start (both with the switch 21 closed and with it open), full load and no load conditions of operation (allowing approximately 2% to 5% plus or minus meter accuracy readings):

TABLE I

| Single Phase Power Input | Winding 14 | Winding 13A | Winding 13B | Cap 27 | Cap 17 |
|---|---|---|---|---|---|
| Start Peak A* (21 closed) | 23 A | 16 A | 23.0 A | 19 A | 19 A | 6.6 A |
| Start Peak A (21 open) | 14 A | 15 A | 14.0 A | 6.5 A | 0 | 6.5 A |
| Full Load A | 5.5 A | 3.1 A | 5.5 A | 8.5 A | 0 | 8.5 A |
| No Load A | 3.2 A | 6.0 A | 3.2 A | 9.0 A | 0 | 9 A |
| Start V* (21 closed) | 240 V | 190 V | 100 V | 80 V | 230 V | 230 V |
| Start V (21 open) | 240 V | 190 V | 60 V | 25 V | 0 | 200 V |
| Full Load V | 240 V | 230 V | 125 V | 135 V | 0 | 295 V |
| No Load V | 240 V | 240 V | 125 V | 145 V | 0 | 305 V |
| PF* Start (21 closed) | 99% | 90% | 80% | 87% | 0 | 03% |
| PF Start (21 open) | 97% | 89% | 73% | 73% | 0 | 03% |
| PF Full | 90% | 02% | 69% | 80% | 0 | 01% |
| PF No Load | 30% | 02% | 70% | 75% | 0 | 01% |

Key:
A* - Amperes
V* - Volts
PF* - Power Factor

From the measured currents of the motor shown in the above table and illustrated in FIGS. 8 and 9, it can be seen that the motor is capable of producing a relatively high starting torque (moderate when the switch 21 is open and very high when the switch 21 is closed). The starting torque with the switch open is 3.1 foot pounds. With the switch 21 closed, the starting torque is approximately 14.1 foot pounds. At full load or running conditions of operation, the motor developed one horsepower at 3.0 foot pounds of torque at 5.5 amperes of current at 1,750 RPM. The breakdown torque from the motor full load to stalling is in the vicinity of 9 foot pounds. The motor, as originally designed, draws 7.4 amperes for a one horsepower output; so that the modified winding configuration employing the series resonant circuit of the combination of the windings 13A, 13B and capacitor 17 results in significantly higher efficiency during the full load or running condition of operation of the motor.

Figures 12, 13:
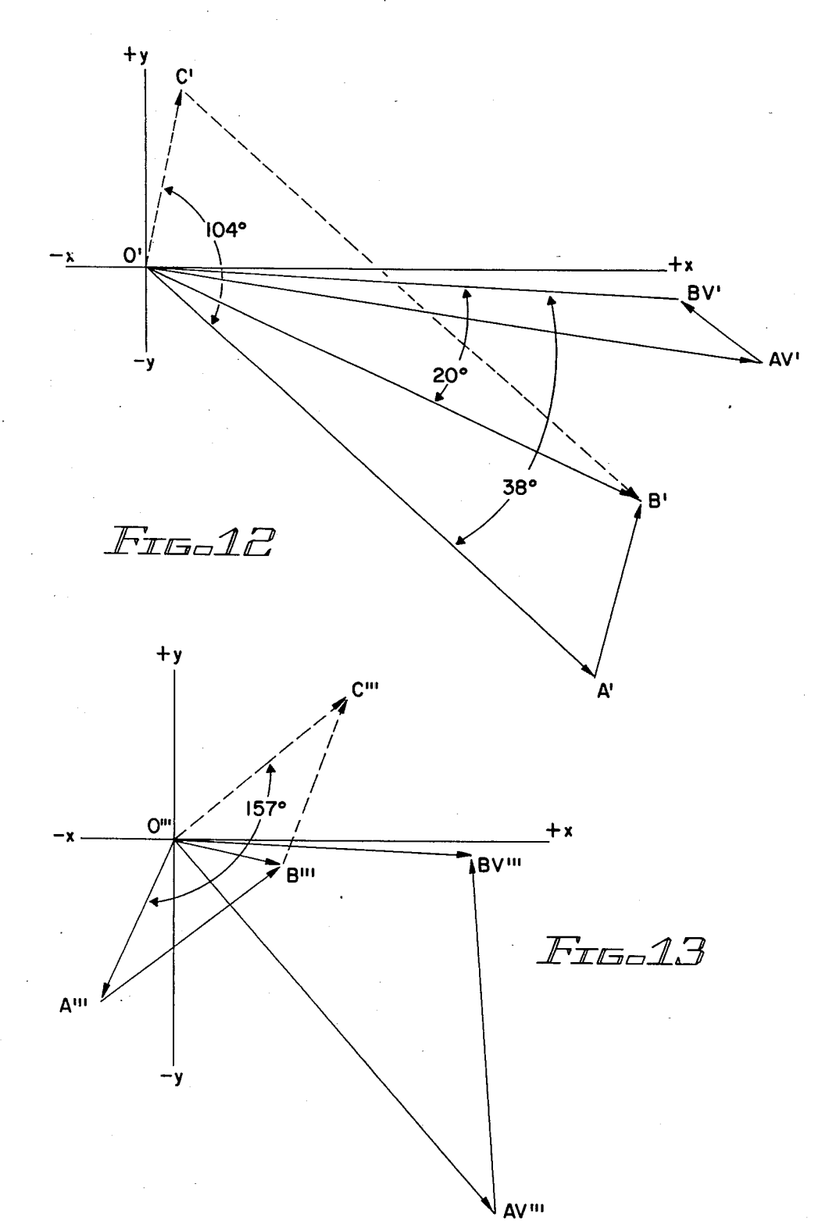

FIGS. 10 through 13 illustrate the current and voltage vectors for a motor constructed in accordance with the circuit configuration of FIG. 2. FIG. 10 is the full load vector diagram, FIG. 11 is the start condition vector diagram with the switch 21 closed, FIG. 12 is the start condition vector diagram with the switch 21 open, and FIG. 13 is the no load vector diagram. The different phase angles are shown and the current vector designations and voltage vector designations which are employed in FIGS. 10, 11, 12 and 13 are comparable to the ones which have been used in FIGS. 9A through 9D. The current vectors simply use letter designations (ABC) with an origin "O", whereas the voltage vectors use the designations AV,BV in conjunction with the origin "O". The current vector OA of Figure 11 represents the current through the start winding 14, and the vector AB represents the current through the run winding 13 of FIG. 2. The voltage vector O/AV is the capacitor voltage of the capacitor 17 and the vector AV/BV constitutes the voltage across the run winding 13. The line voltage is the vector O/BV. The line current is the vector OB, as illustrated in FIG. 11.

The vectors of FIG. 11 comprise the start conditions of the high torque version of the motor which occurs with the switch 21 closed. FIG. 12 illustrates the same vectors for the motor when the switch 21 is open. This motor develops a moderate starting torque, compared with the conditions of operation illustrated in FIG. 11; and the vectors of FIG. 12 include the same designations primed (') as are used in FIG. 11.

FIG. 10 shows the current and voltage vectors for the motor of FIG. 2 operating at full load. The motor under these conditions of operation is drawing 5 amperes of current at a line voltage of 240 volts and is running at 1,750 RPMs. The various phase displacements of both the current and voltage vectors are shown in FIG. 10.

Finally, FIG. 13 illustrates the voltage and current vectors for the motor of FIG. 2 under no load conditions of operation. The voltage vectors do not vary significantly between full load and no load conditions of operation, but it can be seen that the motor current varies from full load to no load by a switch in the current (to a negative current) through the run winding 14 (vector OA''') from the first quadrant to the second quadrant.

An actual motor modified to have the winding configuration providing the basis for the vector diagrams of FIGS. 10 through 13 was constructed. The motor was a standard Dayton motor, frame 56, model 5K4310. As mentioned above, this was a one horsepower motor, 1,725 RPM, 230 volts, 7.4 amperes. The stator was rewound in accordance with the configuration of FIG. 2 with number 16 wire for the winding 13 and with number 18 wire for the winding 14. The number of turns of each winding was essentially the same as in the original motor. The capacitor 17 was 50 MFD at 320VAC. The table reproduced below indicates measurements which were taken at start (with switch 21 closed) start (with switch 21 open) full load and no load conditions of operation (allowing approximately 2% to 5% plus or minus meter accuracy in the readings):

TABLE II

| Single Phase Power Input | Winding 14 | Winding 13 | Capacitor 27 175 MFD | Capacitor 17 50 MFD |
|---|---|---|---|---|
| Start Peak A* (21 closed) | 34 A | 20 A | 22 A | 17 A | 5.7 A |
| Start Peak A (21 open) | 19 A | 20 A | 5.6 A | 0 | 5.6 A |
| Full Load A | 5 A | 3.4 A | 7.3 A | 0 | 7.3 A |
| No Load A | 3.2 A | 6 A | 7.7 A | 0 | 7.7 A |
| Start V* (21 closed) | 230 V | 230 V | 200 V | 290 V | 290 V |
| Start V (21 open) | 230 V | 230 V | 53 V | 0 | 280 V |
| Full Load V | 240 V | 240 V | 280 V | 0 | 380 V |
| No Load V | 240 V | 240 V | 290 V | 0 | 400 V |
| PF* Start (21 closed) | 98% | 82% | 85% | 0 | 03% |
| PF Start (21 open) | 93% | 78% | 77% | 0 | 03% |
| PF Full | 84% | 10% | 62% | 0 | 01% |
| PF No Load | 80% | 29% | 54% | 0 | 01% |

Key:
A* — Amperes
V* — Volts
PF* — Power Factor

The motor of FIG. 2, as is apparent from the above Table II and FIGS. 10 through 13, develops a high starting torque, approximately 14 foot pounds at 34 amperes. This starting torque is comparable to the starting torque of the conventional motor, but with the advantage that the starting winding 14 will not burn out, since the current through it is a maximum of approximately 20 amperes; and this current does not persist for any significant period of time. With the switch 21 open, the moderate starting torque is approximately 3.1 foot pounds at 19 amperes. The breakdown torque of the motor at full load is approximately 9 foot pounds at 1,650 RPM. The motor at full load operates with a current of 5.0 amperes and 240 volts. The rated full load current is 7.4 amperes for the same motor frame with a standard winding configuration. The motor of FIG. 2, however, has significantly higher starting torque.

Figure 14:
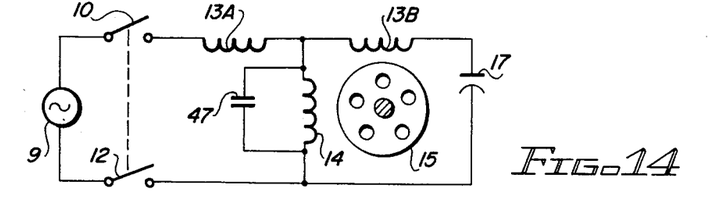
FIG. 14 is another embodiment of the invention.

FIG. 14 illustrates an alternative embodiment of the invention which employs the series resonant circuit described in conjunction with the embodiments of FIGS. 1 through 6 and which further employs a parallel resonant circuit of the type disclosed in my aforementioned co-pending applications and U.S. Pat. No. 4,675,565. The motor of FIG. 14 incorporates the advantages of both parallel resonance and series resonance to provide improved pull-in starting torque and added running torque in cold weather operation of a motor including a winding configuration of the type shown in FIG. 1. Consequently, the same reference numbers are used in FIG. 14 as are used in conjunction with the motor of FIG. 1. The exception is the addition of a relatively large value capacitance 47, connected in parallel with the start winding 14, to provide a series resonant circuit of the winding 14 and the capacitor 47 at the operating frequency of the motor. The series resonant circuit consisting of the windings 13A, 13B and capacitor 17 remains the same as described above in conjunction with FIG. 1, and that series resonant circuit operates in the same manner when it is used in the motor of FIG. 14.

In cold weather, the impedance of motors of the type shown in FIGS. 1 and 14 is low, and the motor requires increased instant starting torque. This increased torque is provided by the capacitor 47 connected across the start winding 14 and increases the pull in torque of the motor when it is started in cold weather. This series resonant circuit consisting of the winding 14 and the capacitor 47 also produces a more balanced circuit for motor starting and running operation. When the motor temperature increases, the motor torque is increased at ambient running temperatures when this motor is compared with the circuit of FIG. 1. The motor of FIG. 14 also may employ a reversing switch 19 of the type described previously in conjunction with FIG. 1 and the starting capacitor circuit 27 along with the centrifugal switch 25, 23 also may be used if desired.

The foregoing description has been directed to several different specific embodiments of the invention. Various changes and modifications may be made to those embodiments by those skilled in the art without departing from the true scope of the invention. For example, only a limited number of winding configurations and starting switch circuits have been illustrated. Others may be employed. Some of the features of the co-pending applications and applicant's above-identified Patents also may be added to or incorporated into the circuits to take advantages of those features. The underlying principle of the invention, that of using series resonant circuits comprising the run winding and a capacitor for providing a high efficiency motor with moderate and high starting torque, may be employed in a variety of stator winding configurations.

I claim:

1. An alternating current motor for operation from a source of single phase alternating current power and having first and second windings electrically angularly displaced from one another substantially 90° on a stator core and inductively coupled to a rotor, said motor including in combination:
- a source of alternating current power;
- first capacitor means;
- means connecting said first winding and said first capacitor means in series circuit with said source of alternating current power throughout the operation of said motor;
- means connecting said second winding in parallel with said series circuit of said first winding and said first capacitor means;
- said first capacitor means and said first winding forming a series resonant circuit at the frequency of alternating current power from said source of alternating current power, with the wire size of first winding selected to be sufficient to carry start, full load, and no load current throughout the time of operation of said motor; and
- said capacitor having a sufficiently large capacitance such that during normal load operating conditions of said motor substantially low current flows through said second winding.

2. The combination according to claim 1 wherein the parameters of said second winding and said first capacitor means are selected such that during normal load conditions of operation of said motor, the full operating current of said motor passes through said first winding, with substantially no current passing through said second winding.

3. The combination according to claim 1 wherein said source of power is a single phase alternating current source of power.

4. The combination according to claim 3 wherein the wire size of said first winding is greater than the wire size of said second winding.

5. The combination according to claim 4 wherein the wire size of said first winding is substantially greater than the wire size of said second winding.

6. The combination according to claim 4 further including first energy dissipation means connected across the first and second terminals of said first capacitor means.

7. The combination according to claim 6 wherein said energy dissipation means comprises a resistor.

8. The combination according to claim 7 further including second capacitor means and first switch means connected in series with said second capacitor means; means for connecting said series-connected first switch means and said second capacitor means in parallel with said first capacitor means; and means coupled with said first switch means for causing said first switch means to be closed during starting of said motor and to be opened during normal load conditions of operation of said motor.

9. The combination according to claim 8 wherein the capacitance of said second capacitor means is greater than the capacitance of said first capacitor means.

10. The combination according to claim 9 wherein said first switch means is a normally closed centrifugal switch coupled with the rotor of said motor; so that upon attainment of a predetermined rotational speed of said rotor, said centrifugal switch is opened to disconnect said second capacitor means from the circuit.

11. The combination according to claim 10 further including second switch means connected in series with said first switch means and said second capacitor for selectively placing said second capacitor into operation in said circuit during starting of said motor when said second switch means is closed to provide a high starting torque and to remove said second capacitor from said motor circuit when said second switch means is opened, both during starting of said motor and normal load conditions of operation of said motor, to cause said motor to operate as a switchless motor with less starting torque than operation when said second switch means is closed.

12. The combination according to claim 11 wherein said source of alternating current power has first and second terminals, and said second winding has first and second ends; and further including reversing switch means operating in a first position thereof to connect the first terminal of said source of power with the first end of said second winding and operating in a second position thereof to connect the second terminal of said source of power with the first end of said second winding and the second end of said second winding with the first terminal of said source of power.

13. The combination according to claim 11 wherein said first winding has first and second ends and said first capacitor means has first and second terminals, with the first terminal of said capacitor means connected to the second end of said first winding; said source of alternating current power has first and second terminals; and said means for connecting said first winding and said first capacitor means in series circuit with said source of alternating current power including reversing switch means operating in a first position for connecting the first end of said first winding and the second terminal of said capacitor with the first and second terminals, respectively, of said source of alternating current power, and in a second position thereof for connecting the first end of said first winding with said second terminal of said source of AC current power and the second terminal of said capacitor means with the first terminal of said of alternating current power.

14. The combination according to claim 1 wherein said first winding has first and second portions joined at a center tap, and said second winding is connected to said center tap on said first winding such that the first portion of said first winding and said second winding are connected in series with said source of alternating current power and said second portion of said first winding and said first capacitor means are connected in series with one another in parallel with said second winding.

15. The combination according to claim 1 further including a variable reactor connected in series with said first capacitor means and said first winding means across said source of alternating current power.

16. The combination according to claim 1 further including variable reactor means connected in series with said second winding across said source of alternating current power.

17. The combination according to claim 1 wherein said source of alternating current power has first and second terminals, and said second winding has first and second ends; and further including reversing switch means operating in a first position thereof to connect the first terminal of said source of power with the first end of said second winding and operating in a second position thereof to connect the second terminal of said source of power with the first end of said second winding and the second end of said second winding with the first terminal of said source of power.

18. The combination according to claim 1 wherein said first winding has first and second ends and said first capacitor means has first and second terminals, with the first terminal of said capacitor means connected to the second end of said first winding; said source of alternating current power has first and second terminals; and said means for connecting said first winding and said first capacitor means in series circuit with said source of alternating current power including reversing switch means operating in a first position for connecting the first end of said first winding and the second terminal of said capacitor with the first and second terminals, respectively, of said source of alternating current power, and in a second position thereof for connecting the first end of said first winding with said second terminal of said source of AC current power and the second terminal of said capacitor means with the first terminal of said of alternating current power.

19. The combination according to claim 1 wherein the wire size of said first winding is greater than the wire size of said second winding.

20. The combination according to claim 19 further including second capacitor means and first switch means connected in series with said second capacitor means; means for connecting said series-connected first switch means and said second capacitor means in parallel with said first capacitor means; and means coupled with said first switch means for causing said first switch means to be closed during starting of said motor and to be opened during normal load conditions of operation of said motor.

21. The combination according to claim 20 wherein the capacitance of said second capacitor means is greater than the capacitance of said first capacitor means.

22. The combination according to claim 21 further including first energy dissipation means connected across the first and second terminals of said first capacitor means.

23. The combination according to claim 22 further including second energy dissipation means connected across said second capacitor means.

24. The combination according to claim 23 further including second switch means connected in series with said first switch means and said second capacitor for selectively placing said second capacitor into operation in said circuit during starting of said motor when said second switch means is closed to provide a high starting torque and to remove said second capacitor from said motor circuit when said second switch means is opened, both during starting of said motor and normal load conditions of operation of said motor, to cause said motor to operate as a switchless motor with less starting torque than operation when said second switch means is closed.

25. The combination according to claim 24 wherein said first switch means is a normally closed centrifugal switch coupled with the rotor of said motor; so that upon attainment of a predetermined rotational speed of said rotor, said centrifugal switch is opened to disconnect said second capacitor means from the circuit.

26. The combination according to claim 1 further including second capacitor means connected in parallel with said second winding to form a parallel resonant circuit therewith at the frequency of alternating current power from said source of alternating current power.

* * * * *